US009352768B2

(12) United States Patent
Doursoux et al.

(10) Patent No.: US 9,352,768 B2
(45) Date of Patent: May 31, 2016

(54) STEERING WHEEL

(75) Inventors: Hugues Doursoux, Latille (FR); Olivier Bertrand, Courcôme (FR); Patrick Guerin, Villiers (FR); Emmanuelle Baloge, Rouille (FR); Laurent Groleau, Quincay (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 95 days.

(21) Appl. No.: 14/009,480

(22) PCT Filed: Mar. 16, 2012

(86) PCT No.: PCT/GB2012/000249
§ 371 (c)(1),
(2), (4) Date: Oct. 2, 2013

(87) PCT Pub. No.: WO2012/136948
PCT Pub. Date: Oct. 11, 2012

(65) Prior Publication Data
US 2014/0013898 A1  Jan. 16, 2014

(30) Foreign Application Priority Data
Apr. 6, 2011  (EP) ..................................... 11161383

(51) Int. Cl.
*B62D 1/06* (2006.01)
(52) U.S. Cl.
CPC ............... *B62D 1/06* (2013.01); *Y10T 74/2087* (2015.01)
(58) Field of Classification Search
CPC ............ Y10T 4/20834; Y10T 4/20876; Y10T 29/49488; B62D 1/04; B62D 1/06; B62D 1/065; B29L 2031/3047
See application file for complete search history.

(56) References Cited

U.S. PATENT DOCUMENTS

| 6,499,377 | B1 * | 12/2002 | Schuler | .................... B62D 1/06 74/558 |
| 2007/0137413 | A1 * | 6/2007 | Xu et al. | ......................... 74/552 |
| 2009/0151506 | A1 | 6/2009 | Haart et al. | |

FOREIGN PATENT DOCUMENTS

| DE | 10155859 A1 * | 7/2002 | ............... B62D 1/06 |
| DE | 10328988 A1 | 1/2005 | |
| DE | 10200802777 B3 | 1/2010 | |
| EP | 1069023 A1 | 1/2001 | |

(Continued)

OTHER PUBLICATIONS

Machine Translation of DE 10 2008 027 777, obtained May 1, 2015.*
Machine translation of DE 10155859, obtained Oct. 7, 2015.*

(Continued)

*Primary Examiner* — Richard W Ridley
*Assistant Examiner* — Brian McGovern
(74) *Attorney, Agent, or Firm* — Stephen T. Olson; Harness, Dickey & Pierce, P.L.C.

(57) ABSTRACT

A steering wheel has a gripping formation including an armature substantially encapsulated by a cover of foamed material and a flexible outer skin provided over and around the cover. The flexible skin may be formed of leather or artificial leather. The steering wheel may include a plastic insert engaged within a fixing groove or recess formed in the cover. At least one edge of the outer skin may be positioned within the fixing groove or recess and fixed to the insert by ultrasonic welding, for example. In a preferred arrangement, two opposed edges of the outer skin may be both received within the fixing groove or recess and fixed to the insert therein by ultrasonic welding.

6 Claims, 10 Drawing Sheets

(56) References Cited

FOREIGN PATENT DOCUMENTS

| EP | 1964751 A2 | 9/2008 |
|----|------------|--------|
| GB | 980673 A | 1/1965 |
| GB | 1 398 685 A | 6/1975 |

OTHER PUBLICATIONS

International Search Report and Written Opinion for PCT/SE2012/050328, ISA/SE, mailed May 11, 2012.

International Search Report and Written Opinion for PCT/GB2012/000249, ISAS/EP, mailed Nov. 22, 2012.

* cited by examiner

STEERING WHEEL

CROSS-REFERENCE TO RELATED APPLICATIONS

This application is a 371 U.S. National Stage of International Application No. PCT/GB2012/000249, filed Mar. 16, 2012, which claims priority to French Patent Application No. 11161383.2, filed Apr. 6, 2011. The disclosures of the above applications are entirely incorporated by reference herein.

FIELD

The present invention relates to a steering wheel, for example of the sort found in a motor vehicle.

BACKGROUND

Conventional steering wheels suitable for use in motor vehicles typically comprise a metal frame having a central boss from which one or more spokes extend in a generally radial direction. A generally circular or near-circular metal armature is supported by the radially outermost ends of the spokes in order to define part of a peripheral rim of the steering wheel, to be gripped by the driver of the vehicle. The armature is typically covered by a resilient covering, and the covering is finished with an outer skin. The outer skin is applied over the resilient covering to provide a visually and haptically pleasing peripheral surface to the steering wheel. It is conventional for the outer skin to be provided with a surface relief pattern of some sort, partly to improve the appearance and feel of the steering wheel, but also to provide an appropriate level of friction between the wheel and the hands of the driver to ensure the wheel can be properly gripped in use.

The external appearance of a motor vehicle steering wheel has a significant effect on the general feeling of wellbeing imparted to the driver of the vehicle and can thus play a role in a person's purchase decision when choosing a new car.

For these reasons, luxury, or so-called "premium" motor vehicles often have steering wheels whose rim is covered with leather or artificial leather. Conventional leather-covered steering wheels have their outer skins stitched around the rim. More particularly, the leather or artificial leather outer skin is provided with a plurality of spaced apart holes or eyes along its long sides, through which a fixing thread is stitched to secure the skin over and around the rim. The resulting line of stitching is usually formed on the rear of the rim, or radially inwardly so that it faces the central hub of the steering wheel. However, a significant disadvantage of this sort of arrangement is that its manufacture requires a large amount of manual work and is therefore complicated and expensive.

SUMMARY

It is therefore an object of the present invention to provide an improved steering wheel suitable for use in a motor vehicle.

According to the present invention, there is provided a steering wheel having a gripping formation comprising an armature substantially encapsulated by a cover of foamed material, and a flexible outer skin provided over and around the cover, the steering wheel being characterised by the provision of a plastic insert engaged within a fixing groove or recess formed in the cover, wherein at least one edge of the outer skin is positioned within the fixing groove or recess and fixed to the insert therein by means of ultrasonic welding.

Preferably, the outer skin is formed of leather or artificial leather.

Advantageously, two opposed edges of the outer skin are both received within the fixing groove or recess and fixed to the insert therein by means of ultrasonic welding.

Conveniently, said opposed edges of the outer skin are each fixed to spaced apart side walls of the insert.

Preferably, said gripping formation includes a rim of the steering wheel and said fixing groove or recess is formed around substantially the entire extent of the rim, generally circumferentially with respect to the steering wheel.

Advantageously, the fixing groove or recess is formed around a front region of the rim.

Conveniently, the steering wheel further comprises a decorative element engaged with or otherwise affixed to the insert so as to substantially cover the or each edge of the outer skin positioned within the fixing groove or recess.

Preferably, the decorative element is elongate.

Advantageously, the decorative element substantially conforms to the path of the fixing groove or recess around the rim of the steering wheel.

Conveniently, the free ends of the decorative element are positioned generally adjacent one another and are covered by a second decorative element.

Preferably, the decorative element is flexible.

Advantageously, the decorative element is formed of plastic material.

Conveniently, the decorative element is formed by an extrusion process. Alternatively, the decorative element may be injection moulded.

Preferably, the decorative element is clipped to the insert or engaged with the insert as an interference fit.

Advantageously, the decorative element has a chromatic surface.

Conveniently, the outer skin comprises at least one locating formation on its rear surface, the or each location formation being received within a respective locating groove or recess formed in the cover.

Preferably, said gripping formation includes a rim of the steering wheel and at least one said locating groove or recess is formed around substantially the entire extent of the rim, circumferentially with respect to the steering wheel.

Advantageously, said locating groove or recess is formed around a rear part of the rim.

Conveniently, at least one said locating groove or recess is formed around the radial cross-section of the rim.

Preferably, at least one said locating groove or recess is formed around an inner part of the rim.

Advantageously, the outer skin is formed from a plurality of discrete interconnected panels.

Conveniently, said panels are interconnected at least one seam, the or each seam comprising overlapped regions of at least two discrete panels.

Preferably, the or each said seam defines a respective said locating formation, and the overlapped regions of said panels forming each seam are located in a respective locating groove or recess.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
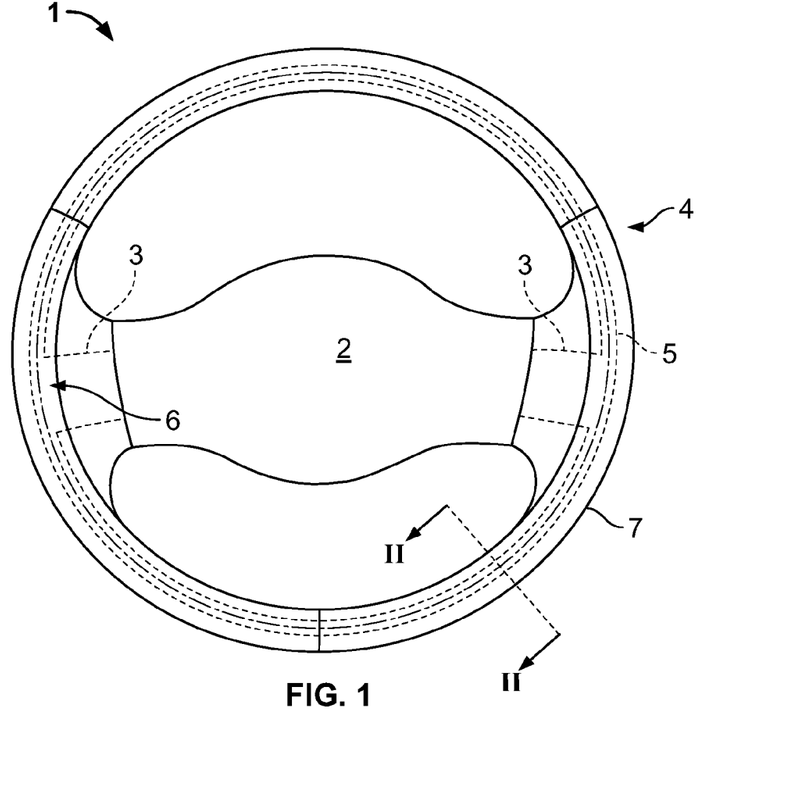
FIG. 1 is a schematic part sectional illustration of a steering wheel frame.

Referring initially to FIG. 1 of the drawings, there is illustrated a steering wheel 1 comprising a central hub 2 from which a plurality of spokes 3 extend substantially radially, the spokes supporting an outer rim 4. The particular steering wheel illustrated comprises two spokes 3, but it should be appreciated that steering wheels in accordance with the invention could comprise more spokes than this, or could even comprise just a single spoke. More particularly, it is to be noted that the radially outermost ends of the spokes 3 support a generally circular or approximately circular metal armature 5 (illustrated in dashed lines in FIG. 1). Together, the hub 2, spokes 3, and armature 5 of the steering wheel can be considered to form an integral frame. The armature 5, and optionally at least a region of the spokes 3 (which together may be considered to represent a gripping portion of the wheel suitable to be gripped by the driver), may be provided with a foam cover 6. The cover 6 is formed from foamed material and may, for example, comprise polyurethane foam or expanded polypropylene. In the arrangement illustrated in FIG. 1, the foam cover 6 serves to completely encapsulate the underlying armature 5 whilst also cover the radially outermost region of each spoke 3. As thus far described, the steering wheel 1 is generally conventional.

As will be described in more detail below, the foam cover 6 is wrapped with an outer skin 7. The present invention most particularly concerns the manner in which the outer skin 7 is affixed to the gripping portion of the steering wheel. The outer skin 7 takes the form of a relatively thin flexible sheet, and is preferably either natural leather or artificial leather having similar visual and haptic properties to natural leather.

Figure 2:
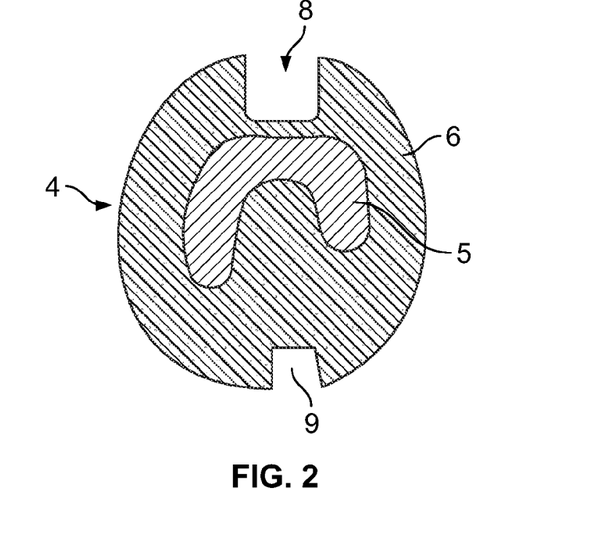
FIG. 2 is a radial cross-sectional view taken along line II-II on FIG. 1, through the rim of the steering wheel.

FIG. 2 shows a cross-section through the rim 4 of the steering wheel, taken along line II-II in FIG. 2, but with the outer skin 7 omitted. As will be seen, the central armature 5 has a generally U-shaped profile in radial cross-section. This profile is not essential to the invention however. As mentioned above, the armature 5 is encapsulated by the foam cover 6 which has a generally circular or slightly ovoid in radial cross-section.

A fixing groove 8 is formed in the cover 6. The fixing groove 8 has a substantially square or rectangular cross-sectional profile and preferably extends around substantially the entire extent of the rim 4, generally circumferentially with respect to the steering wheel as illustrated most clearly in FIG. 3. In the case of the particular steering wheel illustrated, the fixing groove 8 is formed around a front region of the rim 4 (i.e. a region of the rim which will face the driver of the vehicle). However, it is envisaged that in other embodiments the fixing groove could be provided elsewhere about the radial cross-section of the rim 4, for example on the outside or perhaps on the rear part, facing away from the driver. The fixing groove 8 is open along its entire length.

FIG. 2 also shows a first locating groove 9 formed in the cover 6. The locating groove 9 also has a substantially square or rectangular cross-sectional profile and preferably extends around substantially the entire extent of the rim 4, generally circumferentially with respect to the steering wheel as illustrated most clearly in FIG. 3. In the case of the particular steering wheel illustrated, the locating groove 9 is formed around a rear region of the rim 4 (i.e. a region of the rim which will face away from the driver of the vehicle) and is thus diametrically opposed to the fixing groove 8 across the rim 4. However, it is envisaged that in other embodiments the locating groove 9 could be provided elsewhere about the radial cross-section of the rim 4. The locating groove 9 is open along its entire length and preferably has a somewhat smaller cross-sectional profile than the fixing groove 8.

Figure 3:
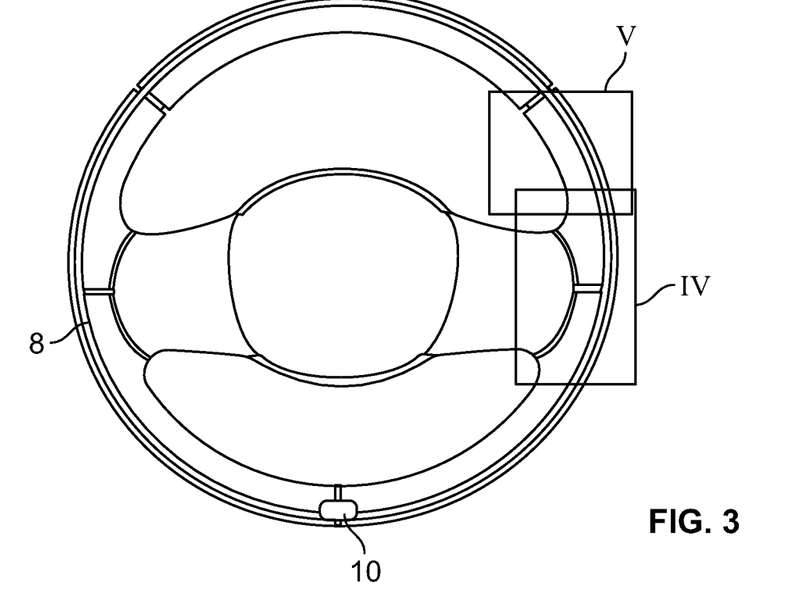
FIG. 3 shows the steering wheel, partially assembled and as viewed from the front.

As shown in FIG. 3, an enlarged recess 10 may be provided within the outer cover 6, at a position along the fixing groove 8. In the particular configuration of steering wheel illustrated, the recess 10 is located at the "six o'clock position" around the rim 4. The fixing groove 8 thus effectively runs from one side of the recess 10, around the rim 4, and back to the other side of the recess 10.

Figure 4:
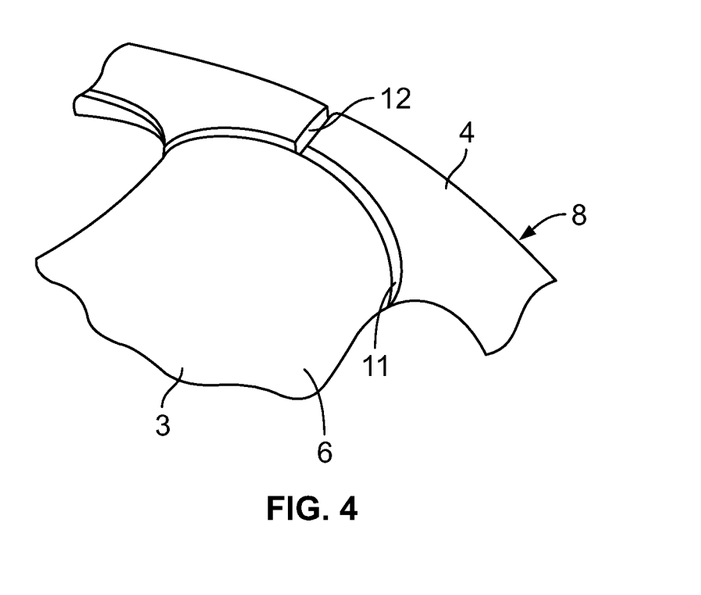
FIG. 4 is an enlarged perspective view of region IV of FIG. 3, showing a front region at which the rim of the steering wheel joins a spoke.
Figure 7:
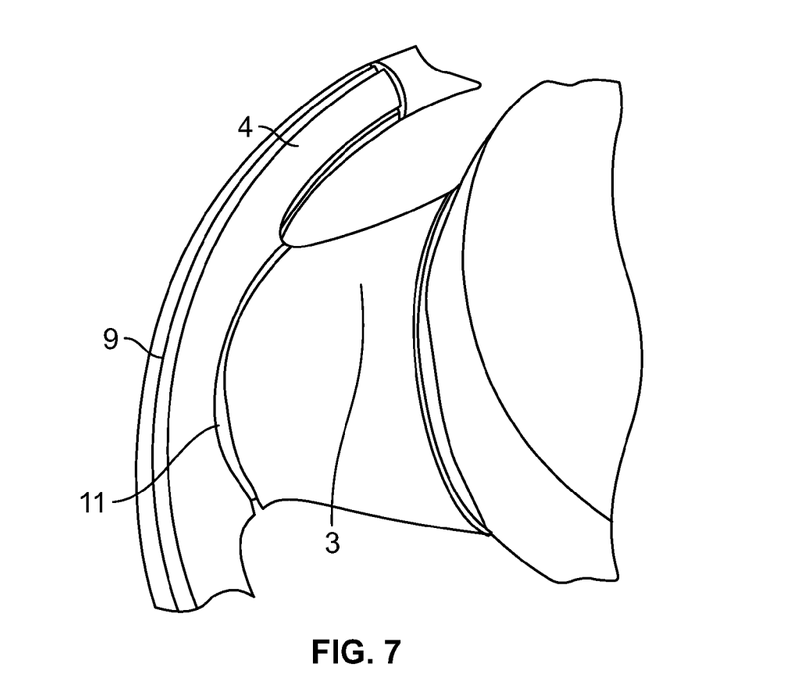
FIG. 7 is an enlarged perspective view of region VII of FIG. 6, showing a rear region at which the rim of the steering wheel joins a spoke.

FIG. 4 shows in detail the region IV of the steering wheel 1 denoted in FIG. 3, and thus shows the intersection between a spoke 3 and the rim 4. As indicated above, the foam covering 6 also extends over the spoke 3 and this is clearly shown in FIG. 4. FIG. 4 also shows two finishing grooves formed in the foam cover 6. The first of these is a groove 11 which extends in a generally arcuate manner around the intersection between the spoke 3 and the rim 4 of the steering wheel. FIG. 7 shows the section of this groove which passes round the rear part of the spoke 3. The second finishing groove 12 runs in a generally radial direction relative the steering wheel as a whole, and extends across the front part of the rim 4 from the mid-point (or thereabouts) of the first finishing groove 11 on the front of the wheel to the fixing groove 8. Each spoke of the steering wheel has a respective first groove 11 formed around its foam covering 6, and also a respective second groove 12.

Figure 5:
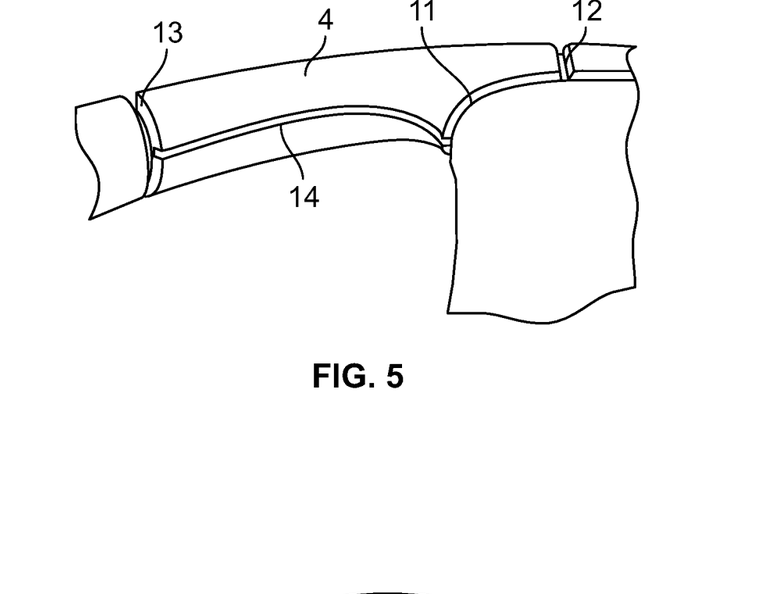
FIG. 5 is an enlarged perspective view of region V of FIG. 3, showing an inner region of the rim of the steering wheel.
Figure 6:
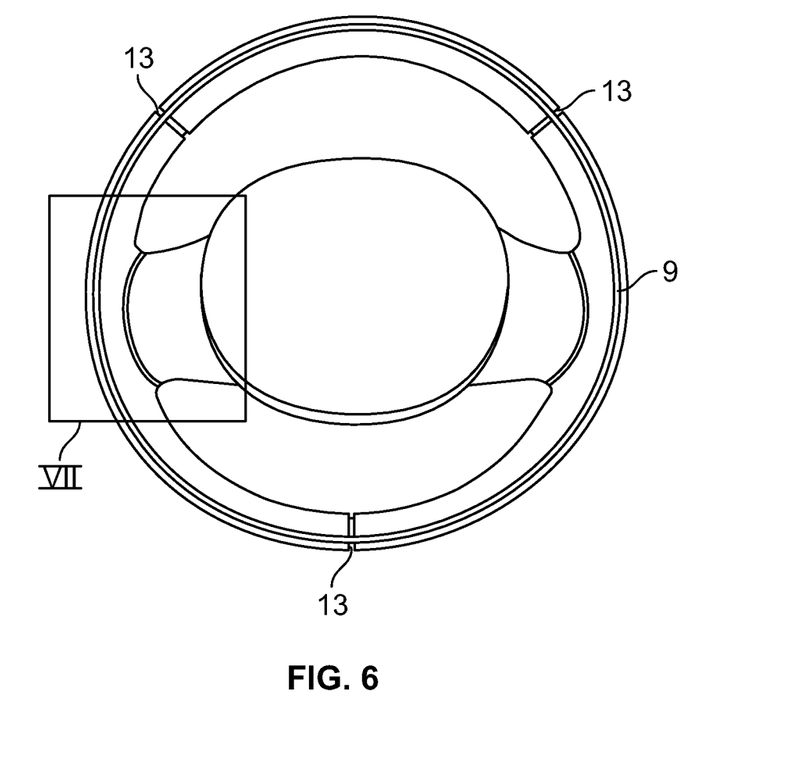
FIG. 6 shows the steering wheel, partially assembled and as viewed from the rear.

FIG. 5 shows in detail the region V of the steering wheel 1 denoted in FIG. 3, and thus shows the radially inwardly facing region of the rim 4, adjacent the spoke 3. Spaced a short distance from the intersection between the rim 4 and the spoke 4, there is provided a second locating groove 13 which is formed in the foam cover 6 and which extends around the radial cross-section of the rim 4. The steering wheel 1 may be provided with a plurality of these radial locating grooves 13, for example as shown in FIG. 6 in which the steering wheel has three such grooves spaced around its rim 4. A third locating groove 14 is also provided, the third locating groove 14 being formed in the foam cover 6 around the inner part of the rim 4 and which extends from the second locating groove to the groove 11 formed around the end of the spoke 3.

Figure 8:
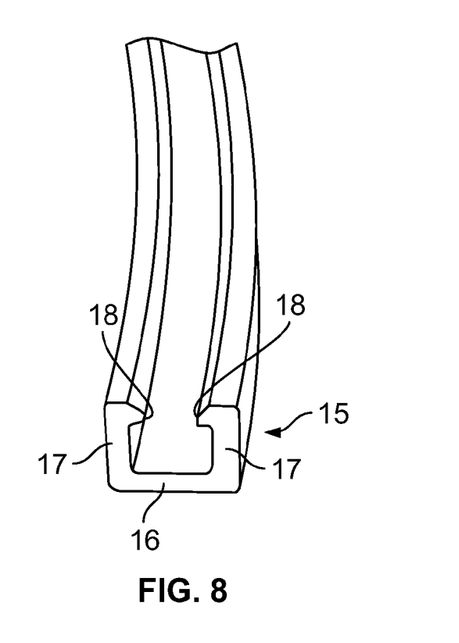
FIG. 8 is a perspective view showing an insert element forming part of the steering wheel of the present invention.

Turning now to consider FIG. 8, there is shown a plastic insert element 15. The plastic insert element takes the form of an elongate open channel of generally U-shaped cross-section having a base 16 supporting a pair of upstanding spaced-apart side-walls 17. Each side-wall 17 terminates with an inwardly directed projection 18 in the form of a gripping tooth or the like. The insert 15 is preferably flexible along its length and its side-walls are resiliently deformable. The insert 15 may be formed via a plastic extrusion process and from any suitable plastics material providing that the material is susceptible to melting and fusion upon application of ultrasonic energy. However, it is currently proposed to form the insert element 15 via an injection moulding process, in which case it is proposed that the insert 15 will have a pre-formed ring shape, in its relaxed condition, corresponding to the path of the fixing groove 8.

Figure 9:
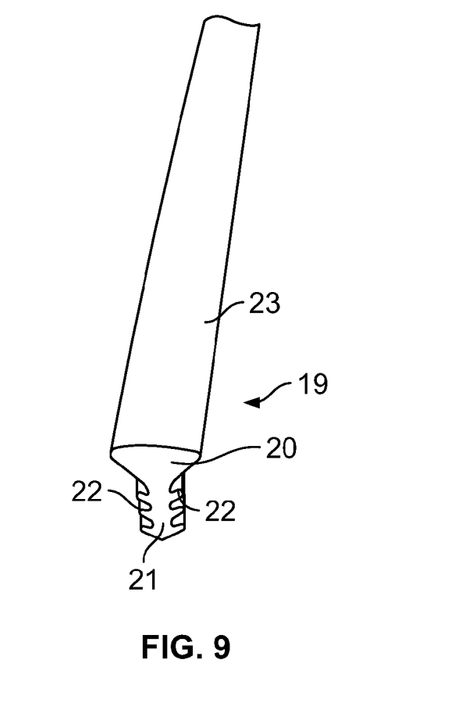
FIG. 9 is a perspective view showing a decorative element forming part of the steering wheel.

FIG. 9 shows an elongate decorative element 19. The decorative element 19 can be formed from metal, plastic, or indeed any other suitable material deemed to provide a suitable visual appearance within the context of a motor vehicle cabin. However, it is currently proposed to form the decorative element from plastics material via an injection moulding process.

The decorative element 19 illustrated has a generally T-shaped cross-sectional profile comprising a head portion 20 from which a shank portion 21 depends. The shank portion 21 has a plurality of gripping formations which preferably take the form of outwardly directed projections 22. The head portion 20 has an outwardly presented surface 23 which is configured to have appropriate visual and haptic properties for the vehicle in which the steering wheel is intended to be used. For example, the outer surface 23 may have a matt finish, a gloss finish, and/or may be chromatic.

It should be appreciated, however, that the decorative element 19 can be provided in alternative configurations and may, for example, have a generally rectangular cross-sectional profile without the gripping formations. It is proposed to pre-from the decorative element 19 into a shape corresponding to the path of the fixing groove 8, which in the arrangement illustrated involves pre-forming the decorative element 19 into the shape of a ring.

Figure 10:
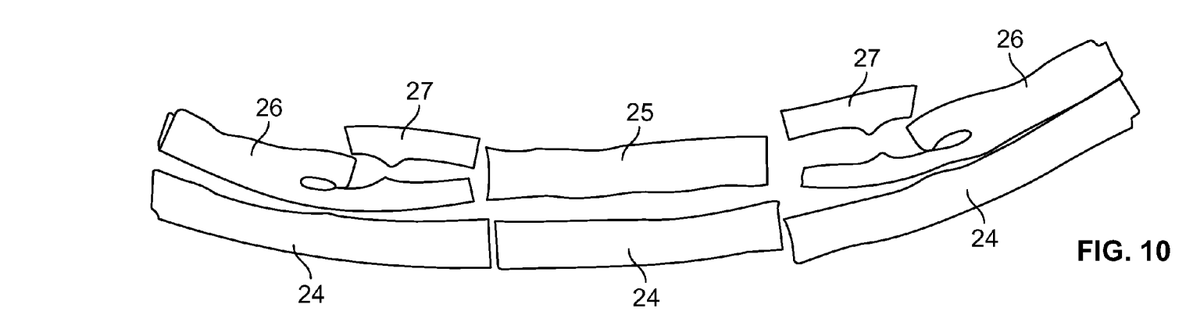
FIG. 10 is a plan view from above, showing a plurality of panels used to form an outer skin of the steering wheel.

Turning now to consider FIGS. 10 to 13, the construction of the outer skin 7 of the steering wheel will be described. FIG. 10 shows a plurality of individual panels which have been cut from a sheet of leather or artificial leather. The panels include three rectangular outer panels 24 (in the sense that they will ultimately be wrapped over respective radially outwardly directed parts of the rim 4), and a single rectangular inner panel 25. Shown located on each side of the rectangular inner panel 25 are a pair of mirror-symmetrical large inner panels 26 and a pair of respective mirror-symmetrical small inner panels 27. In a manner known per se, the mirror-symmetrical panels 26, 27 each have a somewhat complicated shape comprising arcuate edges such that they will fit around the rim 4 of the steering wheel in the region where it meets the spokes 3.

Figures 11, 12, 13:
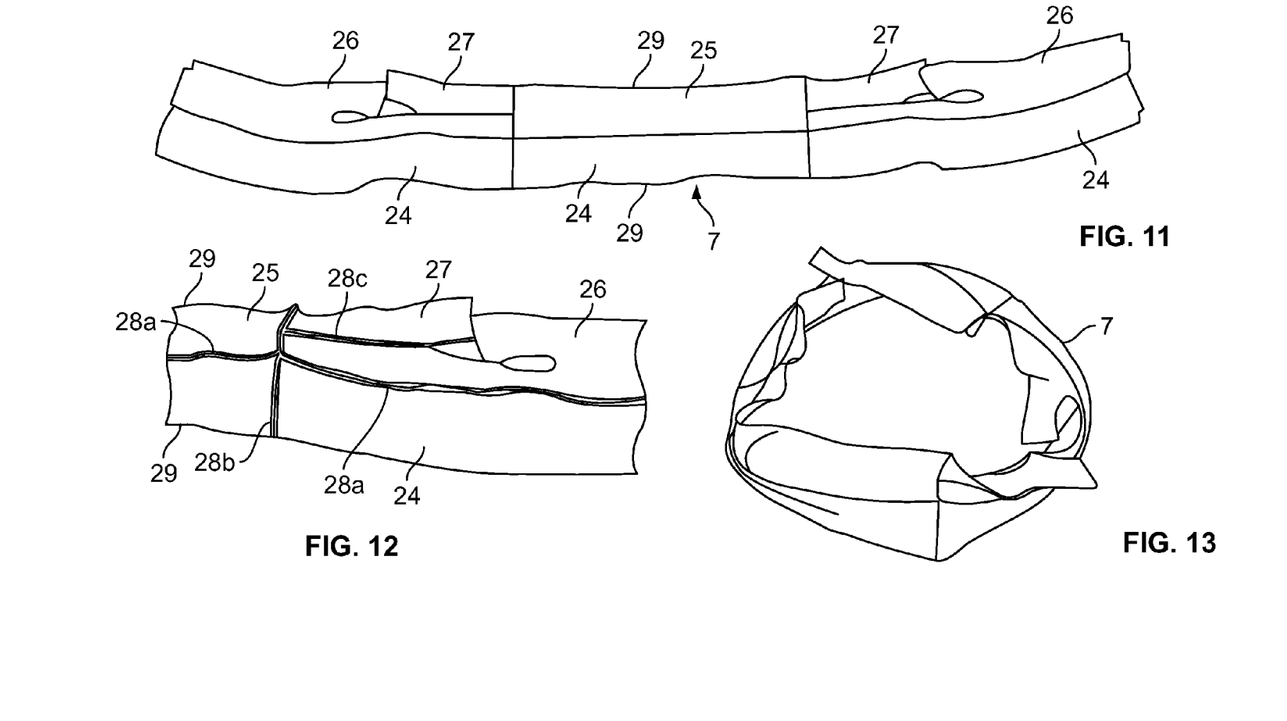
FIG. 11 is a plan view from above, showing the panels illustrated in FIG. 10 interconnected to form a flexible outer skin for the steering wheel.
FIG. 12 is an enlarged view of the part of the outer skin, showing a series of seams interconnecting the panels.
FIG. 13 is a perspective view of the outer skin ready for application over a gripping part of the steering wheel.

FIG. 11 shows the panels 24-27 of FIG. 10 interconnected to one another along abutting edge regions so as to form a single elongate skin 7. FIG. 12 shows a region of the resulting skin 7 as viewed from the rear side, and thus shows the manner in which the panels are interconnected along their edges. As is generally conventional, the edge regions of adjoining panels are overlapped and then stitched together to form a series of stitched seams 28 on the rear side of the skin 7. Each resulting seam 28 thus projects rearwardly from the skin 7. As will be described below, the projecting seams 28 serve a locating function as the skin 7 is applied over the foam cover 7. The seams 28 can thus be considered to represent locating formations.

FIG. 13 illustrates the generally elongate skin 7 shown in FIG. 11 after its two ends are interconnected to one another by another stitched seam to from the completed skin ready for application to the rim of the steering wheel.

Figure 14:
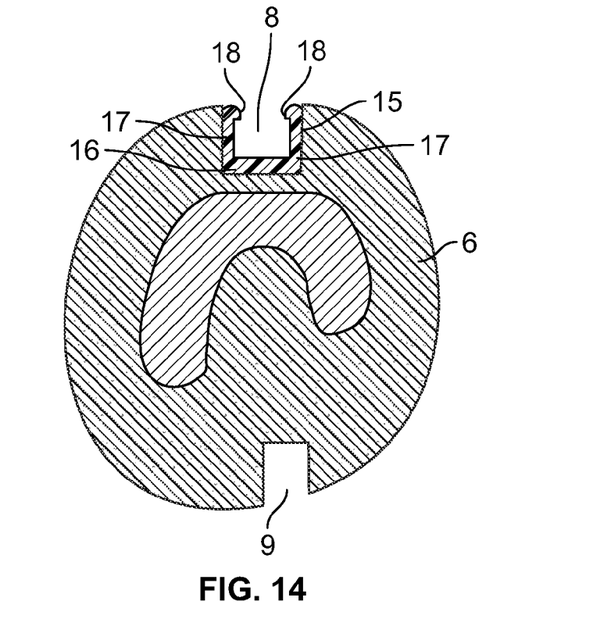
FIG. 14 is a view corresponding generally to that of FIG. 2, showing the insert of 8 engaged within a groove formed in the rim of the steering wheel.

So, turning now to consider FIG. 14, the plastic insert 15 is inserted and engaged within the fixing groove 8 formed in the foam cover 6 around the rim of the steering wheel. More particularly, it will be noted that the insert 15 is pressed fully into the groove 8 such that the base 16 of the insert bears against the bottom surface of the groove and such that the side-walls 17 of the insert bear against the respective sides of the groove. In this position, the inwardly directed projections 18 become located slightly inwardly of the outer surface of the cover 6.

As indicated above, the insert 15 may be flexible and so can be manipulated so as to conform to the path of the fixing groove 8 all around the rim 4. However, in alternative embodiments it may be more convenient to pre-form the insert such that it has a shape generally corresponding to the path of the fixing groove 8. Indeed, it is considered preferable to form the insert 15 as a closed loop which is pre-formed into a shape corresponding to the path of the fixing groove, thereby eliminating any need for a connection or junction between free ends of the insert when it is inserted into the groove 8. Such an arrangement serves to provide a continuous insert 15, free of any gaps or other discontinuities.

Preferably, the insert 15 is preferably received in the fixing groove 8 as an interference fit, resulting from the combined effect of the inherent resilience of the foam material forming the cover 6 and the resiliency of the side-walls 17 of the insert. For this purpose it is proposed that the width of the insert 15 in its relaxed condition may be slightly greater than the width of the undeformed groove 8. The interference fit of the insert 15 within the groove 8 allows it to be securely positioned within the groove 8 without the need for adhesive, fixing tape, welding or the like. In fact, the interference fit of the insert 15 within the groove 8 means that no other fixing step is required apart from aligning the insert 15 with the groove and pressing it fully into the groove, against the inherent resilience of the insert 15. It is to be appreciated, however, that the interference fit of the insert 15 in the fixing groove 8 is not essential, and indeed in variants of the invention the insert 15 may be more loosely received in the groove 8, at least initially.

Once the insert 15 has been positioned in the groove 8 as described above and pressed substantially fully home therein, the outer skin 7 can be offered up to the rim for application thereto.

Figure 15:
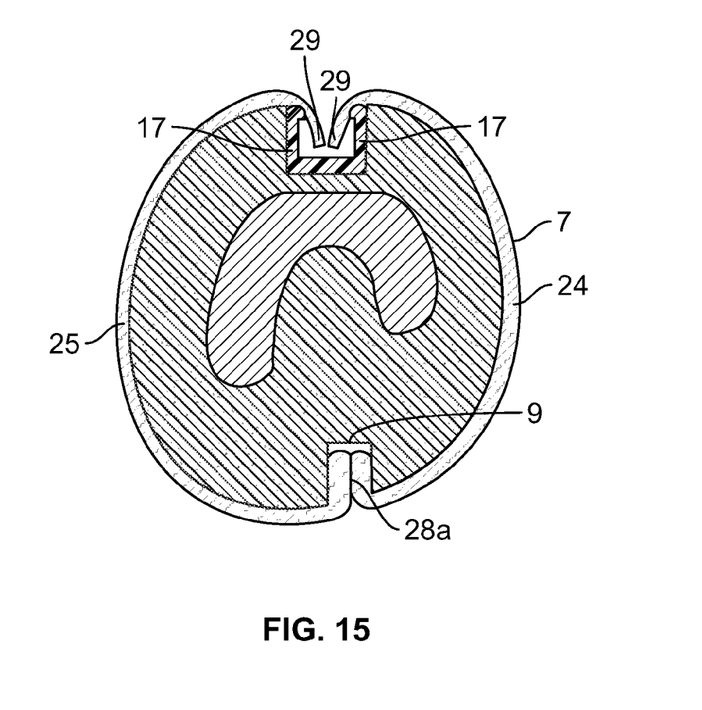
FIG. 15 shows a stage in the application of the outer skin illustrated in FIGS. 10 to 13 to the rim of the steering wheel.

FIG. 15 shows an initial stage in the application of the skin 7 to the rim 4 of the steering wheel. The skin 7 is located relative to the rim 4 by pressing each seam 28 into a respective locating groove 9, 13, 14. It is proposed that firstly the relatively long seams 28a which interconnect the outer panels 24 and the inner panels 25, 26 of the skin 7 will be pressed into the first locating groove 9 running around the rim as illustrated in FIG. 15. Thereafter, the radial seams 28b (see FIG. 12) and the short seams 28c interconnecting the panels 26, 27 can be pressed into the second and third locating grooves 13, 14 (shown in FIG. 5) respectively.

The various panels of the outer skin 7 are then drawn tightly across and around the cover 6 as illustrated in FIG. 15. The opposing free edges 29 of the panels thus become aligned over the fixing channel 8 at the front of the rim. The free edges are then pressed inwardly such that they become located within the fixing groove 8 and more particularly within the insert 15 therein, as illustrated in FIG. 15.

Figure 16:
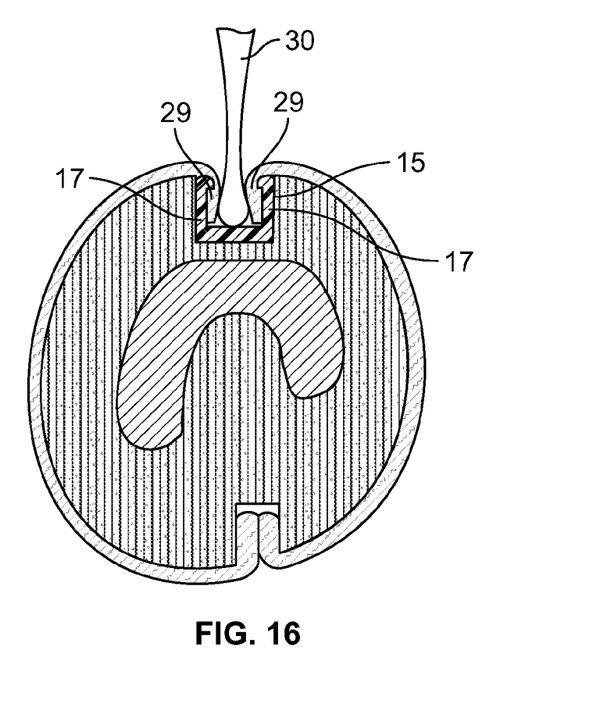
FIG. 16 shows a subsequent stage in the application of the outer skin to the rim.

As illustrated schematically in FIG. 16, the free edges 29 of the outer skin 7 are in fact pressed into the plastic insert 15 by the head 30 of an ultrasonic tool. The head 30 thus serves as a sonotrode and when energised serves to ultrasonically weld the edges 29 of the skin to the side-walls 17 of the plastic insert. More particularly, the localised application of ultrasonic energy from the sonotrode 30 serves to melt the plastic of the insert, and in particular its side-walls 17, such that the plastic flows locally into the irregularities or intertices in the surface of the skin material. When the plastic subsequently solidifies, it grips onto the leather by virtue of its extension into the irregularities or intertices. In this regard, it is to be noted that the inwardly directed projection 18 formed along the upper edge of each side wall 17 serves both to physically grip the edge region of the outer skin 7, but also forms a localised region of plastic material which permits concentration of the ultrasonic weld, thereby improving the regularity and reproducibility of the weld.

The preferred closed loop arrangement of the insert 15 helps to ensure the creation of a secure weld along the entire extent of the free edges 29 of the outer skin 7. More particularly, the closed loop configuration of the insert 15 eliminates any gaps or other discontinuities around the insert 15, which means that the outer skin 7 can be more reliably welded to the insert 15, without needing to bridge any gaps or cover any discontinuities in the insert 15. This provides both a more secure weld, and also a more aesthetically pleasing connection.

It is also to be appreciated at this juncture that because the outer skin 7 is drawn tightly around the cover 6 of the steering wheel, when the outer skin 7 is welded to the insert 15 along its free edges 29, the tension in the outer skin serves to resist movement of the insert 15 out of the fixing groove 8. Thus, as indicated above, whilst an interference fit between the insert 15 and the fixing groove 8 may be considered preferable, this feature is not essential to ensure secure receipt of the insert 15 in the groove 8 in the finished steering wheel without the need for adhesive, fixing tape, welding or the like.

Figure 17:
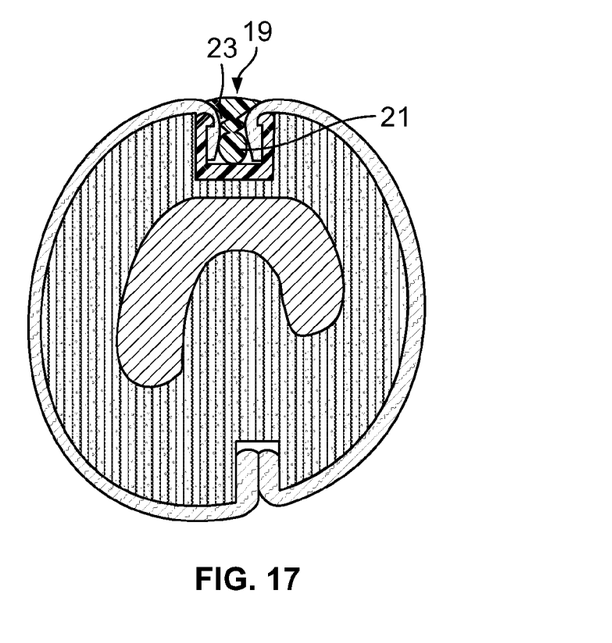
FIG. 17 shows the decorative element of FIG. 9 fitted to the insert of FIG. 8 in the rim of the steering wheel.

As will be appreciated, the appearance of the resulting ultrasonic weld formed along the fixing groove 8 in this manner can be unsightly. The decorative insert 19 is thus then inserted into the groove 8, and more particularly between the welded edges 29 of the outer skin 7. As illustrated in FIG. 17, the decorative insert is pressed into the groove 8 such that its shank portion 21 passes between the edges 29 of the skin 7. As will be appreciated, the outwardly direction projections 22 of the decorative element engage and grip the adjacent edge regions of the outer skin 7 to retain the decorative element in position. Additionally, however, the decorative element may be clipped or engaged with the insert 14 for additional security. Alternatively, in the event that the decorative element 19 is formed from suitable plastics material, it can be ultrasonically welded to the base 16 of the plastic insert 15, via a second welding step. Indeed, it is envisaged that an ultrasonic weld formed in this way between the insert 15 and the decorative element 19 would facilitate the omission of the gripping projections 22 shown in the drawings.

As illustrated in FIG. 17, with the decorative element 19 inserted into the fixing groove 8 as described above, the head part 20 of the element covers, and hence hides the unsightly weld formed between the plastic insert and the edges of the skin within the groove. The outer surface 23 of the decorative insert is thus presented to the driver of the motor vehicle.

Figure 18:
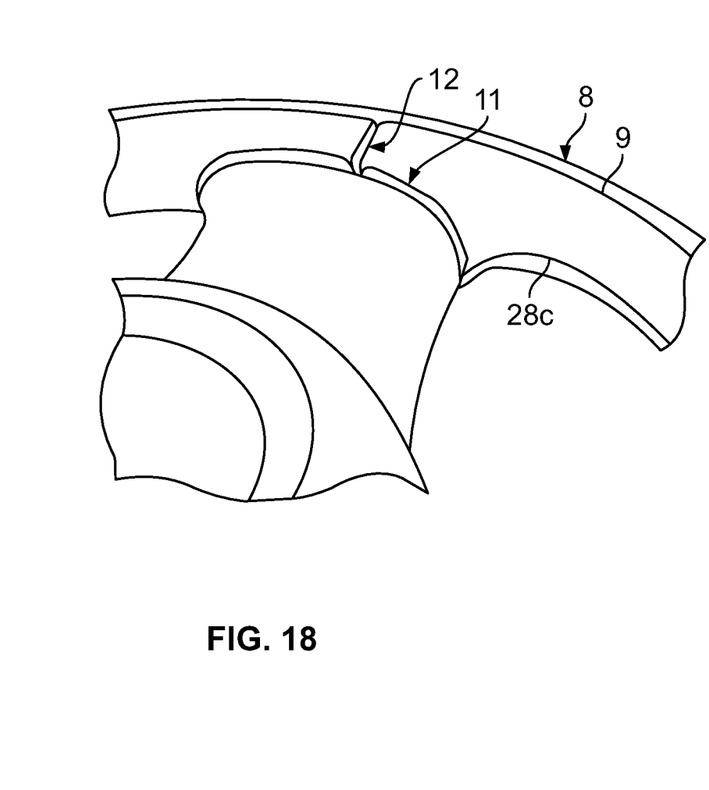
FIG. 18 is a perspective view showing in detail part of the finished steering wheel, as viewed from the front.
Figure 19:
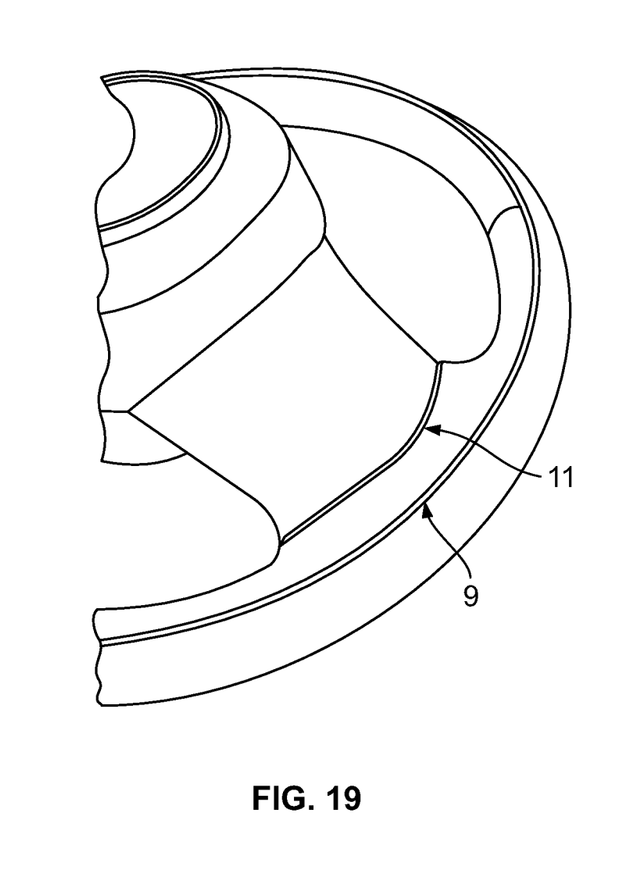
FIG. 19 is a perspective view showing in detail another part of the finished steering wheel, as viewed from the rear.

Following fixture of the outer skin 7 within the fixing groove 8 as described above, the remaining free edges of the panels 26 and 27 of the skin are simply pressed into the finishing grooves 11, 12 as shown in FIGS. 18 and 19.

Figure 20:
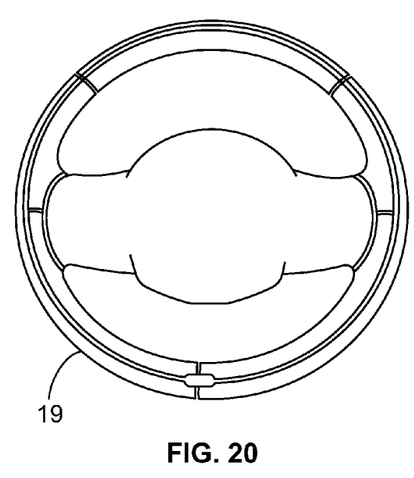
FIG. 20 illustrates the finished steering wheel as viewed from the front.
Figure 21:
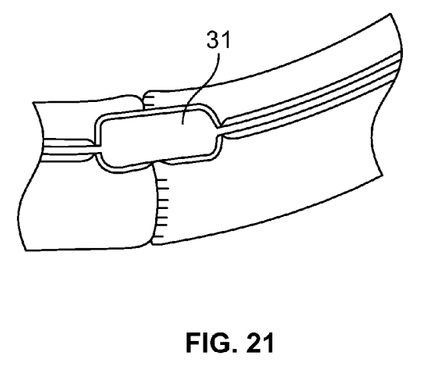
FIG. 21 is an enlarged view of region XXI in FIG. 20.

FIG. 20 shows the finished steering wheel 1 as viewed from the front (as the driver would view it), and thus clearly shows the decorative element extending around the rim of the wheel. As shown in FIG. 21, a second decorative element 31 is received within the recess 10 at the six o'clock position of the wheel, and thus serves to cover and hide the adjacent free ends of the elongate decorative element 19.

Figure 22:
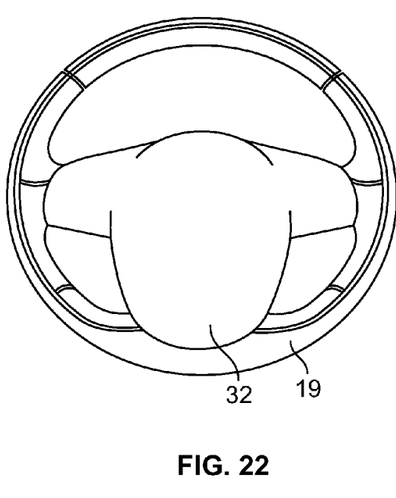
FIG. 22 illustrates a steering wheel in accordance with another embodiment.

FIG. 22 illustrates an alternative arrangement in which the free ends of the decorative element 19 are covered and hidden by part of a trim element 32 which is fitted to the hub of the steering wheel and which extends downwardly to the rim 4 in the manner of another spoke.

In alternative embodiments, it is envisaged that the decorative element 19 may be formed as a closed loop having a pre-formed shape conforming to the path of the insert 15 received in the fixing groove 8. In such an arrangement, it is envisaged that neither the second decorative element 31, or the modified trim element 32 of FIG. 22 will be required, because of course in such an arrangement there will be no unsightly free ends of the decorative element 19 to hide from view.

Figure 23:
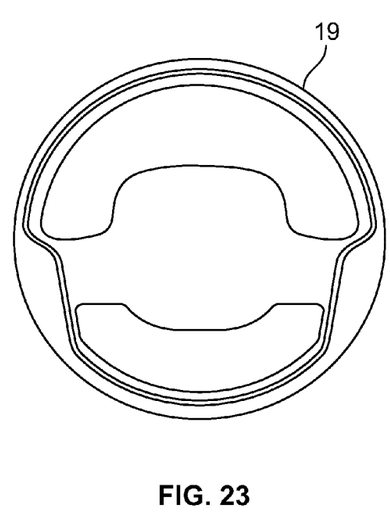
FIG. 23 illustrates a steering wheel in accordance with a further embodiment.

FIG. 23 illustrates another alternative embodiment in which the fixing groove 8, and hence also the cooperative decorative element 19 follow a somewhat serpentine path around the front part of the rim 4.

Figure 24:
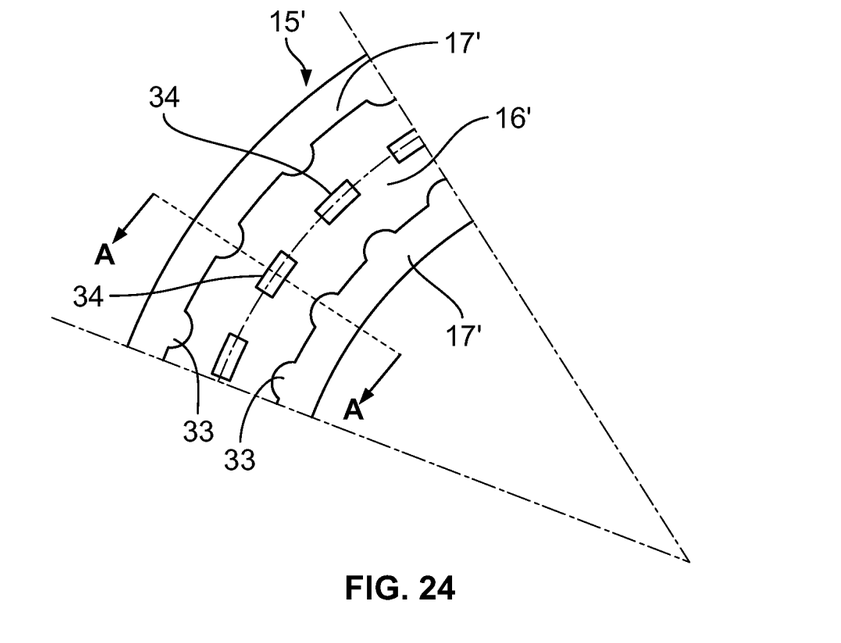
FIG. 24 is a plan view from above showing part of an alternative form of the insert element shown in FIG. 8.
Figure 25:
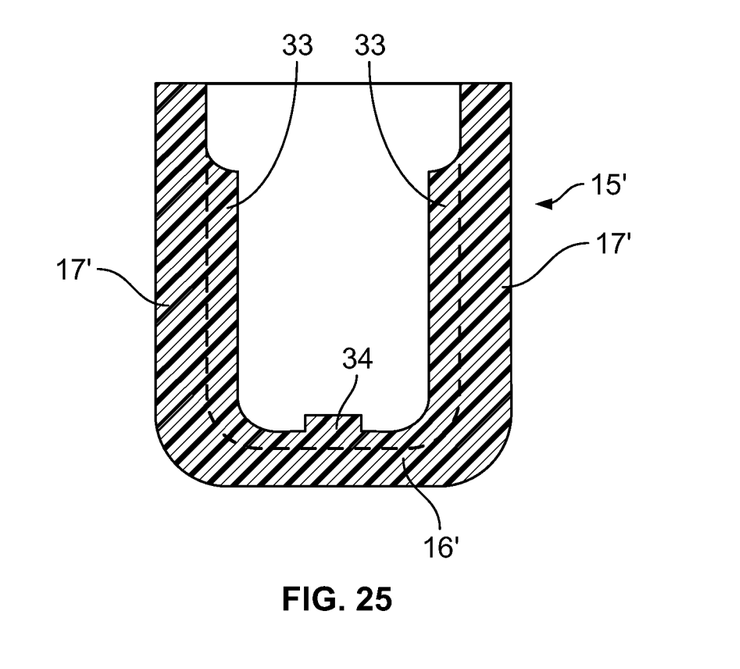
FIG. 25 is a radial cross-sectional view of the alternative insert element, taken along line A-A in FIG. 24.

Turning now to consider FIGS. 24 and 25, an alternative configuration of the plastic insert 15' is illustrated. This form of the insert 15' again takes the form of an elongate channel of generally U-shaped cross-section, having a base 16' and a pair of spaced-apart upstanding side walls 17'. Again, the plastic insert 15' may be flexible along its length, and its side walls 17' are preferably resiliently deformable so that the insert 15' may be inserted into the fixing groove 8 as an interference fit, without the need for further fixture by adhesive, tape, welding etc. The insert element 15' is preferably formed via an injection moulding process, and it is thus proposed that the insert 15' will have a pre-formed ring shape, in its relaxed condition, corresponding to the path of the fixing groove 8.

As will be noted, the alternative insert 15' illustrated in FIGS. 24 and 25 does not have the inwardly directed gripping formations 18 formed along the upper edges of the side-walls as in the case of the version illustrated in FIG. 8. Instead, the insert 15' is provided with inwardly directed projections 33 which extend inwardly from the side walls 17' and which are arranged in pairs spaced-along the length of the insert 15'. The projections 33 of each pair are opposed to one another across the radial width of the insert 15'. It is to be noted, however, that in an alternative variant of this embodiment the projections 33 could be provided in two rows offset relative to one another such that each projection formed on one of the side walls is provided opposite the gap between neighbouring projections on the opposite side wall, and vice-versa. As illustrated in FIG. 25 in particular, the projections 33 each extend vertically up the lower region of the side walls 17', but in the preferred arrangement illustrated terminate at a position spaced slightly below the upper edge of the side walls, so as not to create discontinuities along the otherwise smooth edges of the side walls 17'. The projections 33 are shown in FIG. 24 to have generally arcuate profile, but other profiles are also possible, and indeed it is envisaged that in other embodiments the projections 33 may have a sharper tooth-like profile.

As will be appreciated, the inwardly directed projections 33 will serve to grip the edge regions 29 of the outer skin 7 when it is applied over the cover 6 of the steering wheel as described in detail above. It has been found that this arrangement of inwardly direction projections 33, an improved grip on the edge regions 29 of the outer skin 7 with less tendency to pinch and mark the outer skin 7 in a manner which might be visible from the front of the steering wheel. More generally, the small projections 33 allow concentration of the ultrasonic weld formed between the plastic insert 15 and the outer skin 7, thereby improving the regularity and reproducibility of the weld. Furthermore, the alternative form of insert 15' illustrated in FIGS. 24 and 25 is somewhat easier to manufacture via an injection moulding process than the insert 15 shown in FIG. 8, it being noted that an injection moulded insert 15 is currently considered favourable to an extruded one.

FIGS. 24 and 25 also show another optional feature of preferred embodiments, which can be provided either in combination with the inwardly directed lips 18 of the insert 15 shown in FIG. 8, or in combination with the inwardly directed spaced-apart projections 33 as shown in FIGS. 24 and 25. This additional feature comprises a plurality of spaced-apart protrusions 34 which each are moulded integrally with the plastic insert and which protrude upwardly from the base 16' (or 16 in the case of the FIG. 8 arrangement). More particularly, it will be noted that the protrusions are arranged along the centreline of the insert 15' (or 15). The protrusions 34 serve to provide localised regions of plastic material which are engaged by the lower edge of the decorative insert 19 when inserted between the side walls 17, 17' of the plastic insert 15, 15'. The protrusions 34 thus allow concentration of the weld formed between the decorative insert 19 and the plastic insert 15, 15', thereby improving the regularity and reproducibility of the weld.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A steering wheel comprising:
a gripping formation having an armature;
a cover of foamed material substantially encapsulating the armature;
an outer skin over and around the cover; and
a plastic insert having a first side wall and a second side wall, the first and second sidewalls being spaced apart, the plastic insert engaged within a fixing groove or recess formed in the cover, at least one edge of the outer skin positioned within the fixing groove or recess and fixed to the insert therein by an ultrasonic weld,
wherein the plastic insert includes a first plurality of projections vertically elongated and inwardly extending from the first side wall and a second plurality of projections vertically elongated and inwardly extending from the second side wall, the first and second pluralities of projections gripping each edge of the at least one edge of the outer skin, the projections providing localized regions of plastic material for the ultrasonic weld, each projection of the first plurality of projections is circumferentially spaced from respective adjacent projections within the first plurality of projections.

2. The steering wheel according to claim 1, wherein radially corresponding projections of the first and second plurality of projections are arranged in pairs, each of the pairs spaced apart along a circumference of the plastic insert with the projections of each pair radially opposed to one another across the insert.

3. The steering wheel according to claim 1, wherein the first plurality of projections and the second plurality of projections are provided in two rows offset relative to one another.

4. The steering wheel according to claim 1, wherein the plastic insert includes a base supporting the first and second side walls and further wherein the plastic insert includes protrusions which protrude upwardly from the base.

5. The steering wheel according to claim 1, wherein the plastic insert has a U-shaped cross section, the first and second spaced apart side walls being perpendicular to one another.

6. A steering wheel comprising:
a gripping formation having an armature;
a cover of foamed material substantially encapsulating the armature; an outer skin over and around the cover; and
a plastic insert having a pair of spaced apart side walls, the plastic insert engaged within a fixing groove or recess formed in the cover, at least one edge of the outer skin positioned within the fixing groove or recess and fixed to the insert therein by an ultrasonic weld,
wherein the plastic insert includes a plurality of projections vertically elongated and inwardly extending from the pair of spaced apart side walls and gripping each edge of the at least one edge of the outer skin, the plurality of projections arranged in a plurality of pairs, the pairs spaced apart along a circumference of the plastic insert with the projections of each pair radially opposed to one another across the insert, the plurality of projections providing localized regions of plastic material for the ultrasonic weld.

* * * * *